US012770588B2

(12) United States Patent
Liu et al.

(10) Patent No.: US 12,770,588 B2
(45) Date of Patent: Oct. 20, 2026

(54) DISPLAY DEVICE

(71) Applicant: Guangzhou China Star Optoelectronics Semiconductor Display Technology Co., Ltd., Guangzhou (CN)

(72) Inventors: Yu Liu, Guangzhou (CN); Daobing Hu, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 19/240,082

(22) Filed: Jun. 17, 2025

(65) Prior Publication Data

US 2026/0212836 A1 Jul. 23, 2026

(30) Foreign Application Priority Data

Jan. 20, 2025 (CN) ........................ 202510089170.X

(51) Int. Cl.
*G09G 5/00* (2006.01)
*G09G 3/36* (2006.01)

(52) U.S. Cl.
CPC ... *G09G 3/3677* (2013.01); *G09G 2300/0408* (2013.01); *G09G 2310/0286* (2013.01); *G09G 2320/0247* (2013.01); *G09G 2320/043* (2013.01); *G09G 2330/02* (2013.01); *G09G 2354/00* (2013.01)

(58) Field of Classification Search
CPC ......... G09G 3/3677; G09G 2300/0408; G09G 2310/0286; G09G 2320/0247; G09G 2320/043; G09G 2330/02; G09G 2354/00
USPC .......................................................... 345/212
See application file for complete search history.

(56) References Cited

U.S. PATENT DOCUMENTS

| | | | | |
|---|---|---|---|---|
| 2021/0319763 | A1* | 10/2021 | Xu | G09G 3/3677 |
| 2024/0046844 | A1* | 2/2024 | Feng | G09G 3/2092 |
| 2024/0428716 | A1* | 12/2024 | Wang | E02D 7/14 |
| 2025/0124842 | A1* | 4/2025 | Lim | G09G 3/2092 |

* cited by examiner

*Primary Examiner* — Jennifer T Nguyen
(74) *Attorney, Agent, or Firm* — PV IP PC; Christopher Ruprecht; Wei Te Chung

(57) ABSTRACT

A display device is provided. The display device includes a plurality of gate driver on array (GOA) circuits in a cascaded configuration, and each GOA circuit includes two pull-down sub-circuits. Each of the two pull-down sub-circuit includes an inverter and a pull-down maintainer, and the inverter includes seven transistors. The two pull-down sub-circuits are configured to alternately output a low-level power signal to a second node during a cycle of a predetermined duration, and the predetermined duration may be within a range from a duration of a driving cycle of 160 frames to a duration of a driving cycle of 240 frames.

20 Claims, 2 Drawing Sheets

DISPLAY DEVICE

CROSS-REFERENCE TO RELATED APPLICATION

This application claims priority to and the benefit of Chinese Patent Application No. 202510089170.X, filed on Jan. 20, 2025, the disclosure of which is incorporated herein by reference in its entirety.

TECHNICAL FIELD

The present disclosure relates to the field of display, and in particular, to a display device.

BACKGROUND

In the field of display technology, a gate driver on array (GOA) circuit is generally integrated on a display panel for driving each row of pixels of the display panel. At present, high mobility oxide semiconductor thin film transistors are widely used in the GOA circuit because of their excellent electrical properties.

However, there is a trade-off relationship between the initial threshold voltage (Vth) value and the bias temperature stress stability (PBTIS) of a high mobility oxide semiconductor device. Specifically, the larger the initial threshold voltage value, the worse the bias temperature stress stability is, and the smaller the initial threshold voltage value, the better the bias temperature stress stability. This characteristic of the GOA circuit has technical challenges, for example, for the transistors connected to the key control node Q, a large threshold voltage value is required to prevent leakage current at the key control node Q. However, for the transistors connected to the key control node Q in a pull-down maintainer, a large initial threshold voltage value may lead to poor bias temperature stress stability, and thus, the device may experience significant positive shifts under the positive stress for a long time, causing the key control node Q to fail to be pulled down normally, resulting in abnormal horizontal flicker lines on the display panel.

Therefore, how to ensure the stability of the transistors in the pull-down maintainer while ensuring that the key control node Q does not generate leakage current, is a technical problem to be solved in the current display panel.

SUMMARY

Some embodiments of the present disclosure provide a display device including a plurality of GOA circuits in a cascaded configuration, each of the GOA circuits includes two pull-down sub-circuits, and one of the two pull-down sub-circuits includes a first inverter including:

- a first transistor, where a gate of the first transistor is electrically connected to a reset signal input terminal, a source of the first transistor is electrically connected to a first low-level power input terminal, and a drain of the first transistor is electrically connected to a first node;
- a second transistor, where a gate of the second transistor is electrically connected to a start signal input terminal, a source of the second transistor is electrically connected to the first low-level power input terminal, and a drain of the second transistor is electrically connected to the first node;
- a third transistor, where a gate of the third transistor is electrically connected to a second node, and a source of the third transistor is electrically connected to the first low-level power input terminal;
- a fourth transistor, where a gate of the fourth transistor is electrically connected to the second node, a source of the fourth transistor is electrically connected to the first low-level power input terminal, and a drain of the fourth transistor is electrically connected to the first node;
- a fifth transistor, where both a gate and a source of the fifth transistor are electrically connected to a first control signal input terminal;
- a sixth transistor, where a gate of the sixth transistor is electrically connected to the first control signal input terminal, a source of the sixth transistor is electrically connected to a drain of the fifth transistor, and a drain of the sixth transistor is electrically connected to a drain of the third transistor; and
- a seventh transistor, where a gate of the seventh transistor is electrically connected to the drain of the third transistor, a source of the seventh transistor is electrically connected to the first control signal input terminal, and a drain of the seventh transistor is electrically connected to the first node.

DETAILED DESCRIPTION

The specific embodiments of the present disclosure will be described in detail below in conjunction with the drawings.

The terms "first", "second", and similar words do not indicate any order, quantity, or importance, but are merely used to distinguish different technical features. The term "a plurality of" and similar words indicate two or more than two, unless otherwise explicitly specified.

The embodiments of the present disclosure can be combined with each other.

Figure 1:
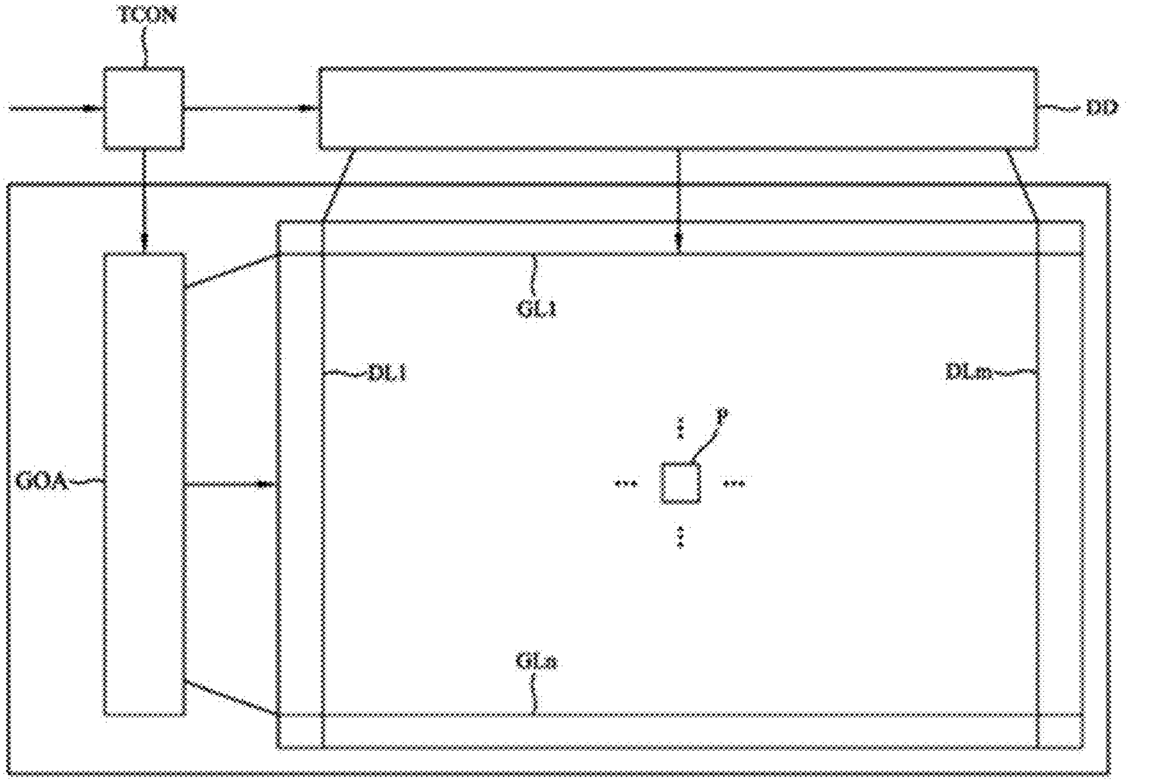
FIG. 1 is a schematic diagram of a display device according to some embodiments of the present disclosure.

As illustrated in FIG. 1, the display device provided by some embodiments of the present disclosure includes a display panel, a timing controller TCON, a source driver circuit DD, and a power management chip (not shown in the figures), and the power management chip may be integrated into the same chip with the timing controller TCON. The display panel may be, for example, a liquid crystal display panel.

The display panel includes a display area and a non-display area. The display area is provided with m×n pixel units P arranged in an array, where m and n are integers greater than 1. The non-display area is located at the periphery of the display area and is used for arranging driving circuits and various signal lines. The display panel further includes a plurality of scanning lines (GL1 to GLn), a plurality of data lines (DL1 to DLm), and a plurality of GOA circuits in a cascaded configuration. The plurality of scanning lines (GL1 to GLn) extend in a first direction and are arranged in a second direction, the plurality of data lines (DL1 to DLm) extend in the second direction and are arranged in the first direction, and the first direction is perpendicular to the second direction. The GOA circuits are disposed in the non-display area and electrically connected to the plurality of scanning lines (GL1 to GLn). The source driver circuit DD is electrically connected to the plurality of data lines (DL1 to DLm) through a flexible printed circuit. The timing controller TCON is electrically connected to both the GOA circuits and the source driver circuit DD.

The display panel includes a thin film transistor array substrate, a opposite substrate, and a liquid crystal layer disposed between the thin film transistor array substrate and the opposite substrate. The thin film transistor array substrate includes a glass substrate, a first metal layer disposed on the glass substrate, a gate insulating layer disposed on the first metal layer, a semiconductor layer disposed on the gate insulating layer, a second metal layer disposed on the semiconductor layer, a passivation layer disposed on the second metal layer, and pixel electrodes disposed on the passivation layer. The first metal layer includes the scanning lines (GL1 to GLn), gates, and the like. The second metal layer includes the data lines (DL1 to DLm), sources, drains, and the like. The opposite substrate includes a glass substrate, a black matrix disposed on the glass substrate, a color filter layer disposed on the black matrix, and common electrodes disposed on the color filter layer.

Each pixel unit P includes at least one thin film transistor and a pixel electrode. A gate of the thin film transistor is electrically connected to a corresponding scanning line, a source of the thin film transistor is electrically connected to a corresponding data line, and a drain of the thin film transistor is electrically connected to a corresponding pixel electrode. When the scanning line outputs a high-level scanning signal, the thin film transistor is turned on, and the data line transmits a data signal to the pixel electrode through the thin film transistor. When the scanning line outputs a low-level scanning signal, the thin film transistor is turned off, and the pixel electrode maintains a voltage corresponding to the data signal.

The plurality of GOA circuits include n stages of GOA units in a cascaded configuration, and each stage of the GOA unit is electrically connected to a scanning line. Under the control of the timing controller TCON, n stages of GOA units are configured to sequentially output scanning signals to scan each row of pixel units P in the display area row by row. The source driver circuit DD is configured to generate and output data signals based on the image data under the control of the timing controller TCON. The timing controller TCON is configured to receive and process image data and timing signals input externally, generate control signals, and transmit the image data to the source driver circuit DD. The power management chip is configured to provide operating voltages to various parts of the display device, including providing a common voltage to the common electrodes of the liquid crystal display panel, providing a gate driving voltage to the GOA circuit, providing a gamma voltage to the source driver circuit DD, and the like.

The embodiments of the present disclosure provide a display device that solves the leakage current and stability problems existing in the GOA circuit having high-mobility oxide semiconductor thin film transistors by improving the GOA circuit.

Some embodiments of the present disclosure provide a display device including a display panel, and the display panel includes a plurality of pixels and a plurality of GOA circuits in a cascaded configuration.

Figure 2:
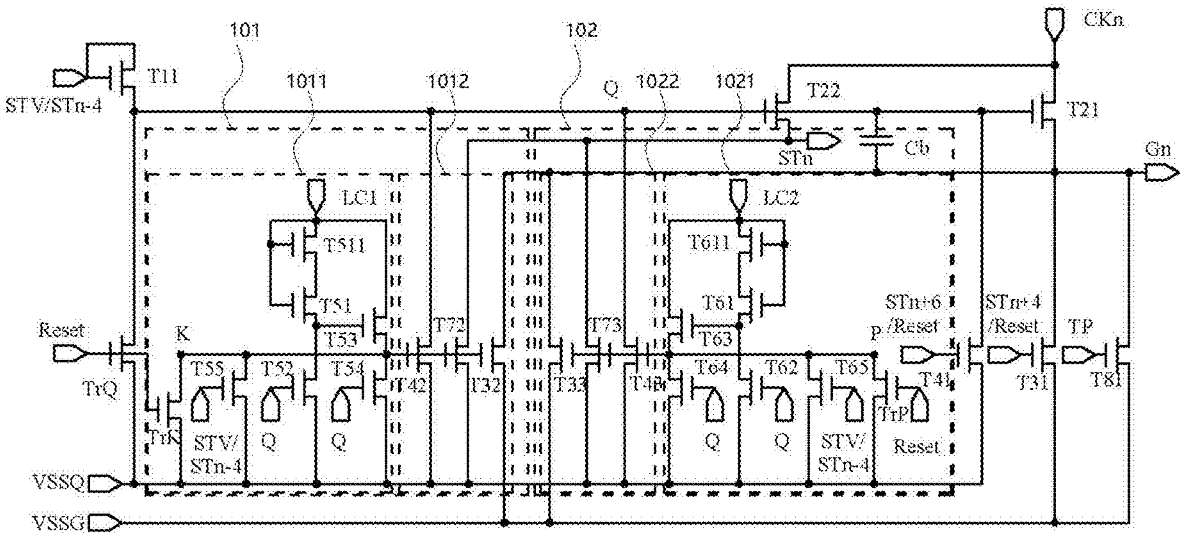
FIG. 2 is a circuit diagram of a GOA circuit of the display device according to some embodiments of the present disclosure.

As illustrated in FIG. 2, each GOA circuit includes two pull-down sub-circuits, and each of the two pull-down sub-circuits includes an inverter and a pull-down maintainer having the same circuit structure. For example, each stage of the GOA circuit includes a first pull-down sub-circuit 101 and a second pull-down sub-circuit 102.

The first pull-down sub-circuit 101 includes a first inverter 1011 and a first pull-down maintainer 1012. The first inverter 1011 includes a first transistor TrK, a second transistor T55, a third transistor T52, a fourth transistor T54, a fifth transistor T511, a sixth transistor T51, and a seventh transistor T53. The first pull-down maintainer 1012 includes an eighth transistor T42, a ninth transistor T72, and a tenth transistor T32. The second pull-down sub-circuit 102 includes a second inverter 1021 and a second pull-down maintainer 1022. The second inverter 1021 includes an eleventh transistor TrP, a twelfth transistor T65, a thirteenth transistor T62, a fourteenth transistor T64, a fifteenth transistor T611, a sixteenth transistor T61, and a seventeenth transistor T63. The second pull-down maintainer 1022 includes an eighteenth transistor T43, a nineteenth transistor T72, and a twentieth transistor T33.

Signal ports of the GOA circuit include a start signal input terminal STV, a stage transmission signal output terminal STn, a first stage transmission signal input terminal (STn−4), a reset signal input terminal Reset, a clock signal input terminal CKn, a first control signal input terminal LC1, a second control signal input terminal LC2, a touch signal input terminal TP, a scan signal output terminal Gn, a first low-level power input terminal VSSQ, and a second low-level power input terminal VSSG.

In the first inverter 1011, a gate of the first transistor TrK is electrically connected to the reset signal input terminal Reset, a source of the first transistor TrK is electrically connected to the first low-level power input terminal VSSQ, and a drain of the first transistor TrK is electrically connected to a first node K. A gate of the second transistor T55 is electrically connected to the start signal input terminal STV or the first stage transmission signal input terminal (STn−4), a source of the second transistor T55 is electrically connected to the first low-level power input terminal VSSQ, and a drain of the second transistor T55 is electrically connected to the first node K. A gate of the third transistor T52 is electrically connected to a second node Q, and a source of the third transistor T52 is electrically connected to the first low-level power input terminal VSSQ. A gate of the fourth transistor T54 is electrically connected to the second node Q, a source of the fourth transistor T54 is electrically connected to the first low-level power input terminal VSSQ, and a drain of the fourth transistor T54 is electrically connected to the first node K. Both a gate and a source of the fifth transistor T511 are electrically connected to the first control signal input terminal LC1. A gate of the sixth transistor T51 is electrically connected to the first control signal input terminal LC1, a source of the sixth transistor T51 is electrically connected to a drain of the fifth transistor T511, and a drain of the sixth transistor T51 is electrically connected to a drain of the third transistor T52. A gate of the seventh transistor T53 is electrically connected to the drain of the third transistor T52, a source of the seventh transistor T53 is electrically connected to the first control signal input terminal LC1, and a drain of the seventh transistor T53 is electrically connected to the first node K.

In the first pull-down maintainer 1012, a gate of the eighth transistor T42 is electrically connected to the first node K, a source of the eighth transistor T42 is electrically connected to the first low-level power input terminal VSSQ, and a drain of the eighth transistor T42 is electrically connected to the second node Q. A gate of the ninth transistor T72 is electrically connected to the first node K, a source of the ninth transistor T72 is electrically connected to the first low-level power input terminal VSSQ, and a drain of the ninth transistor T72 is electrically connected to the stage transmission signal output terminal STn. A gate of the tenth transistor T32 is electrically connected to the first node K, a source of the tenth transistor T32 is electrically connected to the second low-level power input terminal VSSG, and a drain of the tenth transistor T32 is electrically connected to the scan signal output terminal Gn.

The first transistor TrK, the second transistor T55, the third transistor T52, the fourth transistor T54, the fifth transistor T511, the sixth transistor T51, the seventh transistor T53, the eighth transistor T42, the ninth transistor T72, and the tenth transistor T32 are N-type transistors. The eighth transistor T42, the ninth transistor T72, and the tenth transistor T32 are configured to pull down the potential of the second node Q and the potential of the stage transmission signal output terminal STn to the potential of the first low-level power input terminal VSSQ, and to pull down the potential of the scan signal output terminal Gn to the potential of the second low-level power input terminal VSSG under the control of the potential of the first node K.

In the second inverter 1021, a gate of the eleventh transistor TrP is electrically connected to the reset signal input terminal Reset, a source of the eleventh transistor TrP is electrically connected to the first low-level power input terminal VSSQ, and a drain of the eleventh transistor TrP is electrically connected to a third node P. A gate of the twelfth transistor T65 is electrically connected to the start signal input terminal STV or the first stage transmission signal input terminal (STn−4), a source of the twelfth transistor T65 is electrically connected to the first low-level power input terminal VSSQ, and a drain of the twelfth transistor T65 is electrically connected to the third node P. A gate of the thirteenth transistor T62 is electrically connected to the second node Q, and a source of the thirteenth transistor T62 is electrically connected to the first low-level power input terminal VSSQ. A gate of the fourteenth transistor T64 is electrically connected to the second node Q, a source of the fourteenth transistor T64 is electrically connected to the first low-level power input terminal VSSQ, and a drain of the fourteenth transistor T64 is electrically connected to the third node P. Both a gate and a source of the fifteenth transistor T611 are electrically connected to the second control signal input terminal LC2. A gate of the sixteenth transistor T61 is electrically connected to the second control signal input terminal LC2, a source of the sixteenth transistor T61 is electrically connected to a drain of the fifteenth transistor T611, and a drain of the sixteenth transistor T61 is electrically connected to a drain of the thirteenth transistor T62. A gate of the seventeenth transistor T63 is electrically connected to the drain of the thirteenth transistor T62, a source of the seventeenth transistor T63 is electrically connected to the second control signal input terminal LC2, and a drain of the seventeenth transistor T63 is electrically connected to the third node P.

In the second pull-down maintainer 1022, a gate of the eighteenth transistor T43 is electrically connected to the third node P, a source of the eighteenth transistor T43 is electrically connected to the first low-level power input terminal VSSQ, and a drain of the eighteenth transistor T43 is electrically connected to the second node Q. A gate of the nineteenth transistor T73 is electrically connected to the third node P, a source of the nineteenth transistor T73 is electrically connected to the first low-level power input terminal VSSQ, and a drain of the nineteenth transistor T73 is electrically connected to the stage transmission signal output terminal STn. A gate of the twentieth transistor T33 is electrically connected to the third node P, a source of the twentieth transistor T33 is electrically connected to the second low-level power input terminal VSSG, and a drain of the twentieth transistor T33 is electrically connected to the scan signal output terminal Gn.

Furthermore, the GOA circuit further includes a twenty-first transistor T11, a twenty-second transistor TrQ, a twenty-third transistor T21, a twenty-fourth transistor T22, a twenty-fifth transistor T31, a twenty-sixth transistor T41, a twenty-seventh transistor T81, and a capacitor Cb.

Both a gate and a source of the twenty-first transistor T11 are electrically connected to the start signal input terminal STV or the first stage transmission signal input terminal (STn−4), and a drain of the twenty-first transistor T11 is electrically connected to the second node Q. A gate of the twenty-second transistor TrQ is electrically connected to the reset signal input terminal Reset, a source of the twenty-second transistor TrQ is electrically connected to the first low-level power input terminal VSSQ, and a drain of the twenty-second transistor TrQ is electrically connected to the second node Q. A source of the twenty-third transistor T21 is electrically connected to the clock signal input terminal CKn, a gate of the twenty-third transistor T21 is electrically connected to the second node Q, and a drain of the twenty-third transistor T21 is electrically connected to the scan signal output terminal Gn. A source of the twenty-fourth transistor T22 is electrically connected to the clock signal input terminal CKn, a gate of the twenty-fourth transistor T22 is electrically connected to the second node Q, and a drain of the twenty-fourth transistor T22 is electrically connected to the stage transmission signal output terminal STn. A gate of the twenty-fifth transistor T31 is electrically connected to a second stage transmission signal input terminal (Stn+4) or the reset signal input terminal Reset, a source of the twenty-fifth transistor T31 is electrically connected to the second low-level power input terminal VSSG, and a drain of the twenty-fifth transistor T31 is electrically connected to the scan signal output terminal Gn. A gate of the twenty-sixth transistor T41 is electrically connected to a third stage transmission signal input terminal (STn+6) or the reset signal input terminal Reset, a source of the twenty-sixth transistor T41 is electrically connected to the first low-level power input terminal VSSQ, and a drain of the twenty-sixth transistor T41 is electrically connected to the second node Q. A gate of the twenty-seventh transistor T81 is electrically connected to the touch signal input terminal TP, a source of the twenty-seventh transistor T81 is electrically connected to the second low-level power input terminal VSSG, and a drain of the twenty-seventh transistor T81 is electrically connected to the scan signal output terminal Gn.

One electrode plate of the capacitor Cb is electrically connected to the scan signal output terminal Gn, and the other electrode plate of the capacitor Cb is electrically connected to the second node Q.

The eleventh transistor TrP, the twelfth transistor T65, the thirteenth transistor T62, the fourteenth transistor T64, the fifteenth transistor T611, the sixteenth transistor T61, the seventeenth transistor T63, the eighteenth transistor T43, the nineteenth transistor T72, and the twentieth transistor T33 are N-type transistors. The eighteenth transistor T43, the nineteenth transistor T73, and the twentieth transistor T33 are configured to pull down the potential of the second node Q and the potential of the stage transmission signal output terminal STn to the potential of the first low-level power input terminal VSSQ, and to pull down the potential of the scan signal output terminal Gn to the potential of the second low-level power input terminal VSSG under the control of the potential of the third node P.

The two pull-down sub-circuits are configured to alternately output a low-level power signal to the second node Q within a cycle of a predetermined duration. The predetermined duration is not equal to a duration required for the display device to display a single frame. The predetermined duration is within a range from a duration of a driving cycle of 160 frames to a duration of a driving cycle of 240 frames.

Taking the two pull-down sub-circuits including the first pull-down sub-circuit 101 and the second pull-down sub-circuit 102 as an example, during a first period within the cycle of the predetermined duration, the first pull-down sub-circuit 101 is configured to output a low-level power signal to the second node Q, and the second pull-down sub-circuit 102 is configured to output no signal to the second node Q. During a second period after the first period within the cycle of the predetermined duration, the first pull-down sub-circuit 101 is configured to output no signal to the second node Q, and the second pull-down sub-circuit 102 is configured to output the low-level power signal to the second node Q.

In a specific embodiment, the predetermined duration may be equal to a duration of a driving cycle of 200 frames. In this case, the duration of the first period is equal to the duration of a driving cycle of 100 frames, and the duration of the second period is equal to the duration of a driving cycle of other 100 frames.

Specifically, during a display stage within the first period, a first control signal LC1 in the first pull-down sub-circuit 101 maintains at a high level, and a second control signal LC2 in the second pull-down sub-circuit 102 maintains at a low level, so that the first pull-down sub-circuit 101 outputs a low-level power signal to the second node Q, and the second pull-down sub-circuit 102 outputs no signal to the second node Q. During a display stage within the second period, the first control signal LC1 maintains at a low level and the second control signal LC2 maintains at a high level, so that the first pull-down sub-circuit 101 outputs no signal to the second node Q, and the second pull-down sub-circuit 102 outputs a low-level power signal to the second node Q.

The switching between the first control signal LC1 and the second control signal LC2 occurs during a blanking period of a driving cycle of one frame after the end of the driving cycle of every 100 frames. Switching during the blanking period can avoid interference that may affect the display quality during the switching process.

By setting the predetermined duration to be not equal to the duration required for the display device to display a single frame, and setting the predetermined duration within the range from the duration of the driving cycle of 160 frames to the duration of the driving cycle of 240 frames, it is possible to avoid synchronization between the switching of the pull-down sub-circuit and the display rhythm of the display device, thereby avoiding the formation of fixed regular patterns on the screen due to display abnormalities caused by the switching of the pull-down sub-circuit.

Figure 3:
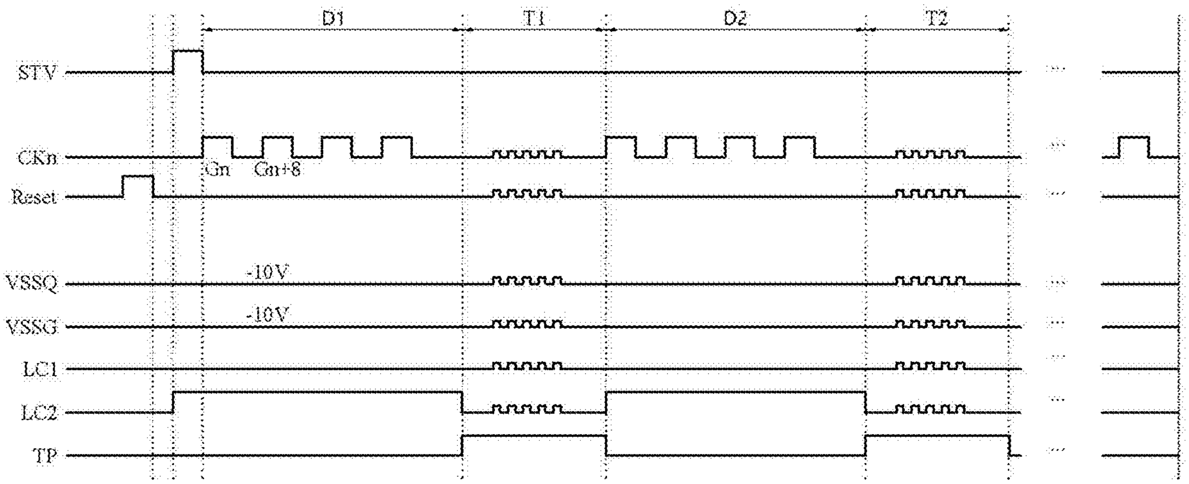
FIG. 3 is a waveform diagram of input signals of the GOA circuit illustrated in FIG. 2.

As illustrated in FIG. 3, which illustrates the timing relationship of various signals of the GOA circuit, includes the following signals: a start signal STV, a clock signal CKn, a reset signal Reset, a first low-level power signal (VSSQ, −10 V), a second low-level power signal (VSSG, −10 V), the first control signal LC1, the second control signal LC2, and a touch signal TP.

The entire timing cycle includes a first display stage D1, a first touch stage T1, a second display stage D2, a second touch stage T2, and so on. The first display stage D1 and the first touch stage T1 constitute a driving cycle of a first frame, and the second display stage D2 and the second touch stage T2 constitute a driving cycle of a second frame.

Before the first display stage D1, the start signal STV outputs a high-level pulse, and the reset signal Reset outputs a high-level pulse, at which time the driving cycle of the first frame begins.

During the first display stage D1, a plurality of clock signals CKn sequentially output a plurality of pulses for driving the GOA circuit to generate scanning signals, the first low-level power signal VSSQ and the second low-level power signal VSSG maintain at a low level of −10 V, the first control signal LC1 maintains at a low level, the second control signal LC2 maintains at a high level, and the touch signal TP maintains at a low level.

During the first touch stage T1, the clock signals CKn, the reset signal Reset, the first low-level power signal VSSQ, the second low-level power signal VSSG, the first control signal LC1, and the second control signal LC2 all exhibit an oscillating state, and the touch signal TP maintains at a high level.

A waveform of the second display stage D2 is the same as a waveform of the first display stage D1. A waveform of the second touch stage T2 is the same as a waveform of the first touch stage T1.

The first control signal LC1 and the second control signal LC2 are switched at a driving cycle of each predetermined number of frames (for example, 100 frames). Specifically, the first control signal LC1 and the second control signal LC2 are switched during the blanking period of the driving cycle of one frame after the end of the driving cycle of every 100 frames. Within a cycle including a driving cycle of a predetermined number of frames (for example, 100 frames), the second control signals LC2 are switched between a high level and a low level while the first control signals LC1 are at a low level. Within a next cycle including a driving cycle of a predetermined number of frames (for example, 100 frames), the first control signals LC1 are switched between a high level and a low level while the second control signals LC2 are at a low level, thereby realizing the alternating operation of the two pull-down sub-circuits.

By providing two pull-down sub-circuits in each GOA circuit and each pull-down sub-circuit including the inverter with a specific structure, the display device provided by the present disclosure can effectively solve the problem of leakage current in the GOA circuit having high-mobility oxide semiconductor thin film transistors. Specifically, the inverter adopts a specific connection structure of seven transistors, so that the voltage of the gate of the transistor connected to the second node Q is significantly reduced, and thus the voltage of the gate/source of the transistor connected to the second node Q is approximately equal to 0 V, effectively reducing the leakage current of these transistors. At the same time, by setting the first transistor TrK and electrically connecting its gate to the reset signal input terminal Reset, the potential of the first node K can be pulled down to the potential of the first low-level power input terminal VSSQ under the control of the reset signal, further ensuring that the transistors connected to the second node Q do not generate the leakage current.

In addition, in the present disclosure, the two pull-down sub-circuits are configured to alternately output a low-level power signal to the second node Q within a cycle of a predetermined duration. Specifically, during the first period, the first pull-down sub-circuit 101 is configured to output a low-level power signal to the second node Q, and the second pull-down sub-circuit 102 is configured to output no signal; and in the second period, the first pull-down sub-circuit 101 is configured to output no signal, and the second pull-down sub-circuit 102 is configured to output a low-level power signal to the second node Q. This alternating operation mode reduces the actual operation time of each pull-down sub-circuit by half, thereby significantly reducing the working stress time of the transistors in the pull-down sub-circuit. In particular, by setting the predetermined duration of the alternating operation within the range from the duration of the driving cycle of 160 frames to the duration of the driving cycle of 240 frames, and setting the predetermined duration to be not equal to the duration required for the display device to display a single frame, normal display of the display device can be ensured, and stress accumulation of the transistors can be reduced, and bias temperature stress stability of the transistors can be effectively improved.

The embodiments of the present disclosure have been described in detail above, and the contents of this specification should not be construed as limiting the scope of protection of the present disclosure.

What is claimed is:

1. A display device comprising a plurality of gate driver on array (GOA) circuits in a cascaded configuration, wherein each of the GOA circuits comprises two pull-down sub-circuits, and one of the two pull-down sub-circuits comprises a first inverter, wherein the first inverter comprises:

a first transistor, wherein a gate of the first transistor is electrically connected to a reset signal input terminal, a source of the first transistor is electrically connected to a first low-level power input terminal, and a drain of the first transistor is electrically connected to a first node;

a second transistor, wherein a gate of the second transistor is electrically connected to a start signal input terminal, a source of the second transistor is electrically connected to the first low-level power input terminal, and a drain of the second transistor is electrically connected to the first node;

a third transistor, wherein a gate of the third transistor is electrically connected to a second node, and a source of the third transistor is electrically connected to the first low-level power input terminal;

a fourth transistor, wherein a gate of the fourth transistor is electrically connected to the second node, a source of the fourth transistor is electrically connected to the first low-level power input terminal, and a drain of the fourth transistor is electrically connected to the first node;

a fifth transistor, wherein both a gate and a source of the fifth transistor are electrically connected to a first control signal input terminal;

a sixth transistor, wherein a gate of the sixth transistor is electrically connected to the first control signal input terminal, a source of the sixth transistor is electrically connected to a drain of the fifth transistor, and a drain of the sixth transistor is electrically connected to a drain of the third transistor; and a seventh transistor, wherein a gate of the seventh transistor is electrically connected to the drain of the third transistor, a source of the seventh transistor is electrically connected to the first control signal input terminal, and a drain of the seventh transistor is electrically connected to the first node;

wherein the two pull-down sub-circuits are configured to alternately output a low-level power signal to the second node within a cycle of a predetermined duration, and the predetermined duration is within a range from a duration of a driving cycle of 160 frames to a duration of a driving cycle of 240 frames.

2. The display device according to claim 1, wherein the one of the two pull-down sub-circuits further comprises a first pull-down maintainer, wherein the first pull-down maintainer comprises:

an eighth transistor, wherein a gate of the eighth transistor is electrically connected to the first node, a source of the eighth transistor is electrically connected to the first low-level power input terminal, and a drain of the eighth transistor is electrically connected to the second node;

a ninth transistor, wherein a gate of the ninth transistor is electrically connected to the first node, a source of the ninth transistor is electrically connected to the first low-level power input terminal, and a drain of the ninth transistor is electrically connected to a stage transmission signal output terminal; and a tenth transistor, wherein a gate of the tenth transistor is electrically connected to the first node, a source of the tenth transistor is electrically connected to a second low-level power input terminal, and a drain of the tenth transistor is electrically connected to a scan signal output terminal.

3. The display device according to claim 2, wherein the third transistor, the fourth transistor, and the eighth transistor are N-type thin film transistors.

4. The display device according to claim 2, wherein the first transistor, the second transistor, the third transistor, the fourth transistor, the fifth transistor, the sixth transistor, the seventh transistor, the eighth transistor, the ninth transistor, and the tenth transistor are N-type transistors.

5. The display device according to claim 1, wherein another of the two pull-down sub-circuits comprises a second inverter, wherein the second inverter comprises:

an eleventh transistor, wherein a gate of the eleventh transistor is electrically connected to the reset signal input terminal, a source of the eleventh transistor is electrically connected to the first low-level power input terminal, and a drain of the eleventh transistor is electrically connected to a third node;

a twelfth transistor, wherein a gate of the twelfth transistor is electrically connected to the start signal input terminal, a source of the twelfth transistor is electrically connected to the first low-level power input terminal, and a drain of the twelfth transistor is electrically connected to the third node;

a thirteenth transistor, wherein a gate of the thirteenth transistor is electrically connected to the second node, and a source of the thirteenth transistor is electrically connected to the first low-level power input terminal;

a fourteenth transistor, wherein a gate of the fourteenth transistor is electrically connected to the second node, a source of the fourteenth transistor is electrically connected to the first low-level power input terminal, and a drain of the fourteenth transistor is electrically connected to the third node;

a fifteenth transistor, wherein both a gate and a source of the fifteenth transistor are electrically connected to a second control signal input terminal;

a sixteenth transistor, wherein a gate of the sixteenth transistor is electrically connected to the second control signal input terminal, a source of the sixteenth transistor is electrically connected to a drain of the fifteenth transistor, and a drain of the sixteenth transistor is electrically connected to a drain of the thirteenth transistor; and a seventeenth transistor, wherein a gate of the seventeenth transistor is electrically connected to the drain of the thirteenth transistor, a source of the seventeenth transistor is electrically connected to the second control signal input terminal, and a drain of the seventeenth transistor is electrically connected to the third node.

6. The display device according to claim 5, wherein the another of the two pull-down sub-circuits further comprises a second pull-down maintainer, wherein the second pull-down maintainer comprises:

an eighteenth transistor, wherein a gate of the eighteenth transistor is electrically connected to the third node, a source of the eighteenth transistor is electrically connected to the first low-level power input terminal, and a drain of the eighteenth transistor is electrically connected to the second node;

a nineteenth transistor, wherein a gate of the nineteenth transistor is electrically connected to the third node, a source of the nineteenth transistor is electrically connected to the first low-level power input terminal, and a drain of the nineteenth transistor is electrically connected to a stage transmission signal output terminal; and a twentieth transistor, wherein a gate of the twentieth transistor is electrically connected to the third node, a source of the twentieth transistor is electrically connected to a second low-level power input terminal, and a drain of the twentieth transistor is electrically connected to a scan signal output terminal.

7. The display device according to claim 6, wherein the thirteenth transistor, the fourteenth transistor, and the eighteenth transistor are N-type thin film transistors.

8. The display device according to claim 6, wherein the eleventh transistor, the twelfth transistor, the thirteenth transistor, the fourteenth transistor, the fifteenth transistor, the sixteenth transistor, the seventeenth transistor, the eighteenth transistor, the nineteenth transistor, and the twentieth transistor are N-type transistors.

9. The display device according to claim 1, wherein the predetermined duration is not equal to a duration required for the display device to display a single frame.

10. The display device according to claim 1, wherein during a first period within the cycle of the predetermined duration, a first pull-down sub-circuit of the two pull-down sub-circuits is configured to output a low-level power signal to the second node, and a second pull-down sub-circuit of the two pull-down sub-circuits is configured to output no signal to the second node; and wherein during a second period after the first period within the cycle of the predetermined duration, the first pull-down sub-circuit is configured to output no signal to the second node, and the second pull-down sub-circuit is configured to output the low-level power signal to the second node.

11. The display device according to claim 1, wherein each of the GOA circuits further comprises:

a twenty-first transistor, wherein both a gate and a source of the twenty-first transistor are electrically connected to the start signal input terminal or a first stage transmission signal input terminal, and a drain of the twenty-first transistor is electrically connected to the second node;

a twenty-second transistor, wherein a gate of the twenty-second transistor is electrically connected to the reset signal input terminal, a source of the twenty-second transistor is electrically connected to the first low-level power input terminal, and a drain of the twenty-second transistor is electrically connected to the second node;

a twenty-third transistor, wherein a gate of the twenty-third transistor is electrically connected to the second node, a source of the twenty-third transistor is electrically connected to a clock signal input terminal, and a drain of the twenty-third transistor is electrically connected to a scan signal output terminal;

a twenty-fourth transistor, wherein a gate of the twenty-fourth transistor is electrically connected to the second node, a source of the twenty-fourth transistor is electrically connected to the clock signal input terminal, and a drain of the twenty-fourth transistor is electrically connected to a stage transmission signal output terminal;

a twenty-fifth transistor, wherein a gate of the twenty-fifth transistor is electrically connected to a second stage transmission signal input terminal or the reset signal input terminal, a source of the twenty-fifth transistor is electrically connected to a second low-level power input terminal, and a drain of the twenty-fifth transistor is electrically connected to the scan signal output terminal;

a twenty-sixth transistor, wherein a gate of the twenty-sixth transistor is electrically connected to a third stage transmission signal input terminal or the reset signal input terminal, a source of the twenty-sixth transistor is electrically connected to the first low-level power input terminal, and a drain of the twenty-sixth transistor is electrically connected to the second node;

a twenty-seventh transistor, wherein a gate of the twenty-seventh transistor is electrically connected to a touch signal input terminal, a source of the twenty-seventh transistor is electrically connected to the second low level power input terminal, and a drain of the twenty-seventh transistor is electrically connected to the scan signal output terminal; and a capacitor, wherein an electrode plate of the capacitor is electrically connected to the scan signal output terminal, and another electrode plate of the capacitor is electrically connected to the second node.

12. A display device comprising a plurality of gate driver on array (GOA) circuits in a cascaded configuration, wherein each of the GOA circuits comprises two pull-down sub-circuits, and one of the two pull-down sub-circuits comprises a first inverter, wherein the first inverter comprises:

a first transistor, wherein a gate of the first transistor is electrically connected to a reset signal input terminal, a source of the first transistor is electrically connected to a first low-level power input terminal, and a drain of the first transistor is electrically connected to a first node;

a second transistor, wherein a gate of the second transistor is electrically connected to a start signal input terminal, a source of the second transistor is electrically connected to the first low-level power input terminal, and a drain of the second transistor is electrically connected to the first node;

a third transistor, wherein a gate of the third transistor is electrically connected to a second node, and a source of the third transistor is electrically connected to the first low-level power input terminal;

a fourth transistor, wherein a gate of the fourth transistor is electrically connected to the second node, a source of the fourth transistor is electrically connected to the first low-level power input terminal, and a drain of the fourth transistor is electrically connected to the first node;

a fifth transistor, wherein both a gate and a source of the fifth transistor are electrically connected to a first control signal input terminal;

a sixth transistor, wherein a gate of the sixth transistor is electrically connected to the first control signal input terminal, a source of the sixth transistor is electrically connected to a drain of the fifth transistor, and a drain of the sixth transistor is electrically connected to a drain of the third transistor; and a seventh transistor, wherein a gate of the seventh transistor is electrically connected to the drain of the third transistor, a source of the seventh transistor is electrically connected to the first control signal input terminal, and a drain of the seventh transistor is electrically connected to the first node;

wherein the two pull-down sub-circuits are configured to alternately output a low-level power signal to the second node within a cycle of a predetermined duration, the predetermined duration is not equal to a duration required for the display device to display a single frame, and the predetermined duration is within a range from a duration of a driving cycle of 160 frames to a duration of a driving cycle of 240 frames.

13. The display device according to claim 12, wherein the one of the two pull-down sub-circuits further comprises a first pull-down maintainer, wherein the first pull-down maintainer comprises:

an eighth transistor, wherein a gate of the eighth transistor is electrically connected to the first node, a source of the eighth transistor is electrically connected to the first low-level power input terminal, and a drain of the eighth transistor is electrically connected to the second node;

a ninth transistor, wherein a gate of the ninth transistor is electrically connected to the first node, a source of the ninth transistor is electrically connected to the first low-level power input terminal, and a drain of the ninth transistor is electrically connected to a stage transmission signal output terminal; and a tenth transistor, wherein a gate of the tenth transistor is electrically connected to the first node, a source of the tenth transistor is electrically connected to a second low-level power input terminal, and a drain of the tenth transistor is electrically connected to a scan signal output terminal.

14. The display device according to claim 13, wherein the first transistor, the second transistor, the third transistor, the fourth transistor, the fifth transistor, the sixth transistor, the seventh transistor, the eighth transistor, the ninth transistor, and the tenth transistor are N-type transistors.

15. The display device according to claim 12, wherein another of the two pull-down sub-circuits comprises a second inverter, wherein the second inverter comprises:

an eleventh transistor, wherein a gate of the eleventh transistor is electrically connected to the reset signal input terminal, a source of the eleventh transistor is electrically connected to the first low-level power input terminal, and a drain of the eleventh transistor is electrically connected to a third node;

a twelfth transistor, wherein a gate of the twelfth transistor is electrically connected to the start signal input terminal, a source of the twelfth transistor is electrically connected to the first low-level power input terminal, and a drain of the twelfth transistor is electrically connected to the third node;

a thirteenth transistor, wherein a gate of the thirteenth transistor is electrically connected to the second node, and a source of the thirteenth transistor is electrically connected to the first low-level power input terminal;

a fourteenth transistor, wherein a gate of the fourteenth transistor is electrically connected to the second node, a source of the fourteenth transistor is electrically connected to the first low-level power input terminal, and a drain of the fourteenth transistor is electrically connected to the third node;

a fifteenth transistor, wherein both a gate and a source of the fifteenth transistor are electrically connected to a second control signal input terminal;

a sixteenth transistor, wherein a gate of the sixteenth transistor is electrically connected to the second control signal input terminal, a source of the sixteenth transistor is electrically connected to a drain of the fifteenth transistor, and a drain of the sixteenth transistor is electrically connected to a drain of the thirteenth transistor; and a seventeenth transistor, wherein a gate of the seventeenth transistor is electrically connected to the drain of the thirteenth transistor, a source of the seventeenth transistor is electrically connected to the second control signal input terminal, and a drain of the seventeenth transistor is electrically connected to the third node.

16. The display device according to claim 15, wherein the another of the two pull-down sub-circuits further comprises a second pull-down maintainer, wherein the second pull-down maintainer comprises:

an eighteenth transistor, wherein a gate of the eighteenth transistor is electrically connected to the third node, a source of the eighteenth transistor is electrically connected to the first low-level power input terminal, and a drain of the eighteenth transistor is electrically connected to the second node;

a nineteenth transistor, wherein a gate of the nineteenth transistor is electrically connected to the third node, a source of the nineteenth transistor is electrically connected to the first low-level power input terminal, and a drain of the nineteenth transistor is electrically connected to a stage transmission signal output terminal; and a twentieth transistor, wherein a gate of the twentieth transistor is electrically connected to the third node, a source of the twentieth transistor is electrically connected to a second low-level power input terminal, and a drain of the twentieth transistor is electrically connected to a scan signal output terminal.

17. The display device according to claim 16, wherein the eleventh transistor, the twelfth transistor, the thirteenth transistor, the fourteenth transistor, the fifteenth transistor, the sixteenth transistor, the seventeenth transistor, the eighteenth transistor, the nineteenth transistor, and the twentieth transistor are N-type transistors.

18. The display device according to claim 12, wherein each of the GOA circuits further comprises:

a twenty-first transistor, wherein both a gate and a source of the twenty-first transistor are electrically connected to the start signal input terminal or a first stage transmission signal input terminal, and a drain of the twenty-first transistor is electrically connected to the second node;

a twenty-second transistor, wherein a gate of the twenty-second transistor is electrically connected to the reset signal input terminal, a source of the twenty-second transistor is electrically connected to the first low-level power input terminal, and a drain of the twenty-second transistor is electrically connected to the second node;

a twenty-third transistor, wherein a gate of the twenty-third transistor is electrically connected to the second node, a source of the twenty-third transistor is electrically connected to a clock signal input terminal, and a drain of the twenty-third transistor is electrically connected to a scan signal output terminal;

a twenty-fourth transistor, wherein a gate of the twenty-fourth transistor is electrically connected to the second node, a source of the twenty-fourth transistor is electrically connected to the clock signal input terminal, and a drain of the twenty-fourth transistor is electrically connected to a stage transmission signal output terminal;

a twenty-fifth transistor, wherein a gate of the twenty-fifth transistor is electrically connected to a second stage transmission signal input terminal or the reset signal input terminal, a source of the twenty-fifth transistor is electrically connected to a second low-level power input terminal, and a drain of the twenty-fifth transistor is electrically connected to the scan signal output terminal;

a twenty-sixth transistor, wherein a gate of the twenty-sixth transistor is electrically connected to a third stage transmission signal input terminal or the reset signal input terminal, a source of the twenty-sixth transistor is electrically connected to the first low-level power input terminal, and a drain of the twenty-sixth transistor is electrically connected to the second node;

a twenty-seventh transistor, wherein a gate of the twenty-seventh transistor is electrically connected to a touch signal input terminal, a source of the twenty-seventh transistor is electrically connected to the second low level power input terminal, and a drain of the twenty-seventh transistor is electrically connected to the scan signal output terminal; and a capacitor, wherein an electrode plate of the capacitor is electrically connected to the scan signal output terminal, and another electrode plate of the capacitor is electrically connected to the second node.

19. A display device comprising a plurality of gate driver on array (GOA) circuits in a cascaded configuration, wherein each of the GOA circuits comprises two pull-down sub-circuits, and one of the two pull-down sub-circuits comprises a first inverter, wherein the first inverter comprises:

a first transistor, wherein a gate of the first transistor is electrically connected to a reset signal input terminal, a source of the first transistor is electrically connected to a first low-level power input terminal, and a drain of the first transistor is electrically connected to a first node;

a second transistor, wherein a gate of the second transistor is electrically connected to a start signal input terminal, a source of the second transistor is electrically connected to the first low-level power input terminal, and a drain of the second transistor is electrically connected to the first node;

a third transistor, wherein a gate of the third transistor is electrically connected to a second node, and a source of the third transistor is electrically connected to the first low-level power input terminal;

a fourth transistor, wherein a gate of the fourth transistor is electrically connected to the second node, a source of the fourth transistor is electrically connected to the first low-level power input terminal, and a drain of the fourth transistor is electrically connected to the first node;

a fifth transistor, wherein both a gate and a source of the fifth transistor are electrically connected to a first control signal input terminal;

a sixth transistor, wherein a gate of the sixth transistor is electrically connected to the first control signal input terminal, a source of the sixth transistor is electrically connected to a drain of the fifth transistor, and a drain of the sixth transistor is electrically connected to a drain of the third transistor; and a seventh transistor, wherein a gate of the seventh transistor is electrically connected to the drain of the third transistor, a source of the seventh transistor is electrically connected to the first control signal input terminal, and a drain of the seventh transistor is electrically connected to the first node;

wherein the two pull-down sub-circuits are configured to alternately output a low-level power signal to the second node within a cycle of a predetermined duration;

during a first period within the cycle of the predetermined duration, a first pull-down sub-circuit of the two pull-down sub-circuits is configured to output a low-level power signal to the second node, and a second pull-down sub-circuit of the two pull-down sub-circuits is configured to output no signal to the second node; and during a second period after the first period within the cycle of the predetermined duration, the first pull-down sub-circuit is configured to output no signal to the second node, and the second pull-down sub-circuit is configured to output the low-level power signal to the second node.

20. The display device according to claim 19, wherein the one of the two pull-down sub-circuits further comprises a first pull-down maintainer, wherein the first pull-down maintainer comprises:

an eighth transistor, wherein a gate of the eighth transistor is electrically connected to the first node, a source of the eighth transistor is electrically connected to the first low-level power input terminal, and a drain of the eighth transistor is electrically connected to the second node;

a ninth transistor, wherein a gate of the ninth transistor is electrically connected to the first node, a source of the ninth transistor is electrically connected to the first low-level power input terminal, and a drain of the ninth transistor is electrically connected to a stage transmission signal output terminal; and a tenth transistor, wherein a gate of the tenth transistor is electrically connected to the first node, a source of the tenth transistor is electrically connected to a second low-level power input terminal, and a drain of the tenth transistor is electrically connected to a scan signal output terminal.

* * * * *